US009262116B2

(12) United States Patent
Eom et al.

(10) Patent No.: US 9,262,116 B2
(45) Date of Patent: Feb. 16, 2016

(54) PRINT CONTROL APPARATUS, IMAGE FORMING APPARATUS, IMAGE FORMING SYSTEM, AND METHOD OF CONTROLLING FOR SPOOLING PRINTING DATA AND HANDLING STATUS INFORMATION ABOUT A WORK OF THE IMAGE FORMING APPARATUS THROUGHOUT PRINTING PROCESS

(71) Applicant: Samsung Electronics Co., Ltd., Suwon-si, Gyeonggi-do (KR)

(72) Inventors: Yong-in Eom, Hwaseong-si (KR); Hoe-go Kim, Suwon-si (KR); Bo-yeon Kim, Suwon-si (KR); In-chang Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/836,021

(22) Filed: Mar. 15, 2013

(65) Prior Publication Data
US 2014/0063538 A1 Mar. 6, 2014

(30) Foreign Application Priority Data

Aug. 28, 2012 (KR) .................. 10-2012-0094355

(51) Int. Cl.
*G06F 3/12* (2006.01)
(52) U.S. Cl.
CPC ............ *G06F 3/1294* (2013.01); *G06F 3/1207* (2013.01); *G06F 3/1259* (2013.01); *G06F 3/1285* (2013.01)

(58) Field of Classification Search
USPC ........................................................ 358/1.15
See application file for complete search history.

(56) References Cited

U.S. PATENT DOCUMENTS

| 7,707,326 B2 | 4/2010 | Wanda | |
|---|---|---|---|
| 2008/0144100 A1* | 6/2008 | Tomii et al. | 358/1.15 |
| 2008/0316530 A1* | 12/2008 | Kurihara | 358/1.15 |
| 2009/0096621 A1 | 4/2009 | Ferlitsch | |
| 2009/0187693 A1* | 7/2009 | Morozumi | 710/313 |
| 2010/0079796 A1* | 4/2010 | Matsushita | 358/1.15 |
| 2010/0220354 A1 | 9/2010 | Honda | |
| 2010/0265542 A1* | 10/2010 | Horiyama | 358/1.15 |
| 2011/0235097 A1 | 9/2011 | Iwasawa | |
| 2011/0255128 A1* | 10/2011 | Ozawa | 358/1.15 |
| 2012/0188598 A1* | 7/2012 | Furuya | 358/1.15 |
| 2012/0212778 A1* | 8/2012 | Sakai | 358/1.15 |

OTHER PUBLICATIONS

Extended European Search Report issued in Application No. 13165322.2 on Apr. 4, 2014.

* cited by examiner

*Primary Examiner* — Qian Yang
(74) *Attorney, Agent, or Firm* — Staas & Halsey LLP

(57) ABSTRACT

A print control apparatus connectable to an image forming apparatus includes a printing data generating unit that generates printing data and spools the printing data to the image forming apparatus; a communication unit that receives status information of the image forming apparatus; and a control unit that controls the communication unit to receive status information about a work of the image forming apparatus even after spooling of the printing data generating unit is completed.

12 Claims, 10 Drawing Sheets

Samsung

Printer  Document  View

| Document Name | Status | Owner | Pages | Size |
|---|---|---|---|---|
| Microsoft Corporation Softwar... | | chris | 2 | 465KB |

1310

1 document(s) in queue

---

Microsoft Corporation: Software, Smartphones, Online, Games,

| General | Layout | Paper/Quality | Download Updates |

Microsoft Corporation: Software, Smartphones, Online, Games,

Size:          476703 bytes
Pages:         2
Datatype:      RAW
Processor:     MS_XPS_PROC
Owner:         chris
Submitted:     5:56:18 AM 5/30/2012
Notify:        chris

1330

Priority:
  Lowest                                    Highest
Current priority:
Schedule:
  ⊙ No time restriction
  ○ Only from    12:00 AM    To    12:00 AM

[OK]  [Cancel]  [Apply]

PRINT CONTROL APPARATUS, IMAGE FORMING APPARATUS, IMAGE FORMING SYSTEM, AND METHOD OF CONTROLLING FOR SPOOLING PRINTING DATA AND HANDLING STATUS INFORMATION ABOUT A WORK OF THE IMAGE FORMING APPARATUS THROUGHOUT PRINTING PROCESS

CROSS-REFERENCE TO RELATED APPLICATIONS

This application claims the benefit under 35 U.S.C. §119 (a) from Korean Patent Application No. 2012-0094355 filed Aug. 28, 2012 in the Korean Intellectual Property Office, the disclosure of which is incorporated herein by reference in its entirety.

BACKGROUND OF THE INVENTION

1. Field of the Invention

The present disclosure relates to a print control apparatus, an image forming apparatus, an image forming system, and a method of controlling the same. More particularly, the present disclosure relates to a print control apparatus, an image forming apparatus, and an image forming system that provides a function of indicating status information of the image forming apparatus, and a method of controlling the same.

2. Description of the Related Art

In recently years, the prevalence of image forming apparatuses has been increased. When a printing job is performed through a terminal apparatus that can be connected to the image forming apparatus, a technology that transmits job status information of the image forming apparatus to the terminal apparatus, and thus displays this job status to a user, is already widely known.

For example, if the image forming apparatus is a printer, after a personal computer (PC) is connected to the printer and transmits printing data to the printer, the printer performs a printing job based on the printing data. At this time, the personal computer performs spooling of the printing data through a spooler, and thus sends the spooled printing data to the printer. Even after the spooling of the printing data from the personal computer to the printer is completed, in most cases, the printer does not complete the printing job based on the printing data. In other words, the printer cannot complete the printing job until after transmission of the printing data from the personal computer to the printer is completed.

However, more recently, due to improvements in personal computer and memory technologies, time difference between spooling of the printing data to the printer and printing job completion of the printer is being improved. At this time, depending on operating systems of the personal computers, there is a case that only in a status that the printing data is being loaded in the spooler, the status information of the printer can be identified.

For example, when the personal computer completes spooling of 100 pages of a document to the printer, but the printer completes printing only 10 pages of the document, if the printer performs a printing job for the remaining 90 pages of the document after the operating system of the personal computer completes the spooling operation, the operating system cannot identify an operation status of the printer. As a result, if the operating system of the personal computer cannot identify the status information of the printer, the operating system of the personal computer cannot feedback the status information of the printer to a user.

SUMMARY OF THE INVENTION

The present disclosure has been developed in order to overcome the above drawbacks and other problems associated with the conventional arrangement. The present disclosure provides a print control apparatus, an image forming apparatus, and an image forming system that can synchronize a printing job completion time of the image forming apparatus and a spooling completion time of the print control apparatus, and provides a function of indicating status information, and a control method thereof.

Additional features and utilities of the present general inventive concept will be set forth in part in the description which follows and, in part, will be obvious from the description, or may be learned by practice of the general inventive concept.

Embodiments of the present disclosure can substantially be achieved by providing a print control apparatus connectable to an image forming apparatus, which may include a printing data generating unit that generates printing data and spools the printing data to the image forming apparatus; a communication unit that receives status information of the image forming apparatus; and a control unit that controls the communication unit to receive status information about a work of the image forming apparatus during and after spooling of the printing data generating unit is completed.

The control unit may determine whether there is a printing completion message included in the status information, and if it is determined that there is the printing completion message, the control unit may terminate operation of the printing data generating unit.

The communication unit may receive the status information by at least one of a universal serial bus (USB) communication connection and a simple network management protocol (SNMP) communication connection.

The print control apparatus may include a display unit; wherein the control unit generates a printing job status screen by using the status information, and displays the generated printing job status screen on the display unit.

The print control apparatus may include a user interface unit; wherein the control unit determines whether synchronizing an operation termination time of the printing data generating unit and a printing job termination time of the image forming apparatus depending on a user command that is input through the user interface unit.

The printing completion message may include a bi-directional extensible markup language (XML) type of message.

The present disclosure also provides an image forming apparatus connectable to a print control apparatus, the image forming apparatus may include a communication unit that receives printing data from the print control apparatus; a print unit that performs a printing job by using the printing data; and a control unit that analyzes status of the printing job to generate status information, and if operation of the print unit is complete, the control unit includes the printing job completion message in the status information, and transmits the printing job completion message.

The communication unit may receive the status information by at least one of a universal serial bus (USB) communication connection and a simple network management protocol (SNMP) communication connection.

The image forming apparatus may include a user interface unit; wherein the control unit generates and transmits the printing job completion message to the print control apparatus depending on a user command that is input through the user interface unit.

The printing job completion message may include a bi-directional extensible markup language (XML) type of message.

The present disclosure also provides a print control method of a print control apparatus connectable to an image forming apparatus, the print control method may include generating printing data and spooling the printing data to the image forming apparatus; receiving status information of a printing job; determining whether the spooling of the printing data is complete; and controlling to receive the status information about the printing job of the image forming apparatus during the spooling and after the spooling is complete.

The controlling to receive the status information about the printing job of the image forming apparatus may include determining whether there is a printing completion message included in the status information; and if it is determined that there is the printing job completion message, terminating the spooling.

The receiving status information of a printing job may receive the status information by at least one of a universal serial bus (USB) communication connection and a simple network management protocol (SNMP) communication connection.

The print control method may include generating a printing job status screen by using the status information; and displaying the printing job status screen.

The print control method may include inputting a user command; and determining whether to execute the controlling to receive the status information about the printing job of the image forming apparatus depending on the input user command.

The printing completion message may include a bi-directional extensible markup language (XML) type of message.

The present disclosure also includes a control method of an image forming apparatus connectable to a print control apparatus, the control method may include receiving printing data from the print control apparatus; performing a printing job by using the printing data; analyzing a status of the printing job to generate status information; and after the printing job is complete, generating a printing job completion message, including the printing job completion message in the status information, and transmitting the status information.

The transmitting the status information may transmit the status information by at least one of a universal serial bus (USB) communication connection and a simple network management protocol (SNMP) communication connection.

The control method may include generating a printing job status screen by using the status information; and displaying the printing job status screen.

The printing job completion message may include a bi-directional extensible markup language (XML) type of message.

The present disclosure also includes an image forming system that may include a print control apparatus that generates and spools printing data; and an image forming apparatus that performs a printing job by using the printing data, wherein even after spooling of the print control apparatus is complete, the image forming apparatus generates status information, and after the printing job is complete, the image forming apparatus generates and transmits a printing job termination message to the print control apparatus, and wherein the print control apparatus searches the printing job termination message in the status information received from the image forming apparatus, and if there is the printing job termination message, the print control apparatus terminates operation thereof.

Other salient features and utilities of the present disclosure will become apparent from the following detailed description, which, taken in conjunction with the annexed drawings, discloses preferred embodiments.

The present disclosure also includes a print control apparatus, comprising: a print data generating unit to generate and spool the print data to an image forming apparatus; and a control unit to communicate two way information with the image forming apparatus and control the termination time of the spooling operation to be synchronized with the completion time of the printing job based on the communication information.

In an exemplary embodiment, the communication information includes status information regarding the work of the image forming apparatus received from the image forming apparatus.

In an exemplary embodiment, status information is from the image forming apparatus during the spooling of the printing data and after completion of the spooling of the printing data.

In an exemplary embodiment, the print control apparatus further comprises a display unit; wherein the control unit generates a printing job status screen by using the received status information, and displays the generated printing job status screen on the display unit.

BRIEF DESCRIPTION OF THE DRAWINGS

These and/or other features and utilities of the present disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE PREFERRED EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
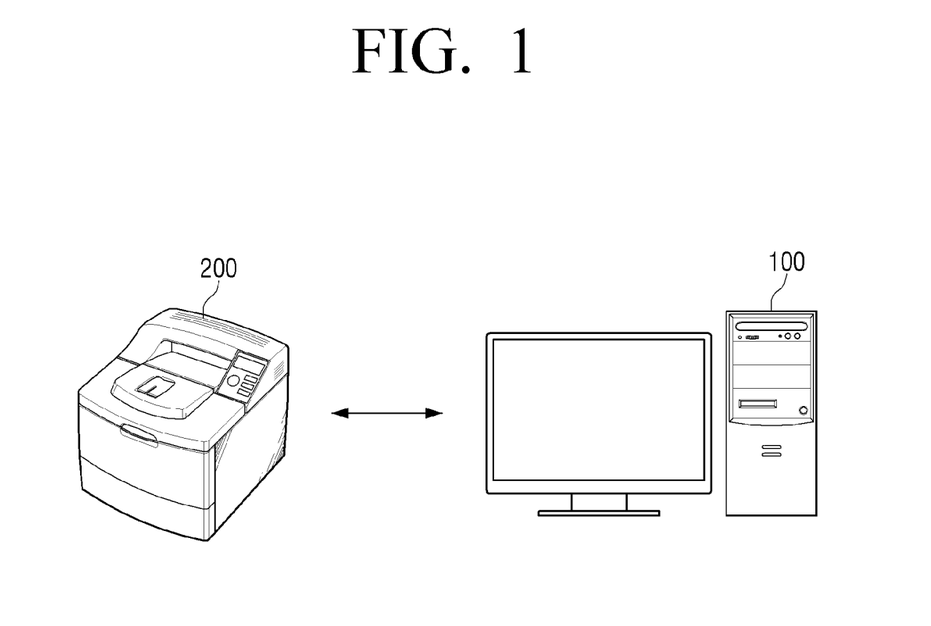
FIG. 1 is a conceptual view illustrating an image forming system according to an embodiment of the present disclosure.

FIG. 1 is a conceptual view illustrating an image forming system according to an embodiment of the present disclosure.

Referring to FIG. 1, an image forming system 1000 includes a print control apparatus 100 and an image forming apparatus 200.

The print control apparatus 100 may be a personal computer (PC), a personal digital assistant (PDA), a smart phone, a laptop, a smart pad, etc. The print control apparatus 100 may be connected to the image forming apparatus 200 by a wire or wireless connection. As a wire communication connection, the print control apparatus 100 can perform a communication interface through a universal serial bus (USB), a wire local area network (LAN), etc. As a wireless communication connection, the print control apparatus 100 can perform a communication interface through a wireless LAN, etc.

The print control apparatus 100 generates printing data, spools the printing data to a spooler, and transmits the printing data to the image forming apparatus 200.

The print control apparatus 100 receives apparatus status information and printing job information from the image forming apparatus 200. Also, the print control apparatus 100 searches whether a printing job termination message is included in the status information received from the image forming apparatus 200. If it is determined that there is the printing job termination message included in the received status information, the print control apparatus 100 terminates the spooling operation, but if it is determined that there is no printing job termination message, the print control apparatus 100 controls the spooling operation to be maintained.

Since the print control apparatus 100 maintains the spooling operation until the image forming apparatus 200 completes the print job, the print control apparatus 100 can control the termination time of the spooling operation to be synchronized with the completion time of the printing job.

The image forming apparatus 200 performs a printing job by using the printing data. The image forming apparatus 200 may include various types of apparatuses such as, for example, an inkjet printer, a laser printer, a scanner, a multifunction apparatus, and a facsimile machine, etc. The image forming apparatus 200 receives a print control signal from the print control apparatus 100, and performs a printing job based on the control signal. While the spooling operation is maintained in the print control apparatus 100, the image forming apparatus 200 generates status information. The image forming apparatus 200 transmits the generated status information to the print control apparatus 100. Also, after the printing job is completed, the image forming apparatus 200 generates a printing job completion message, includes the printing job completion message in the status information, and transmits this information to the print control apparatus 100.

Figure 2:
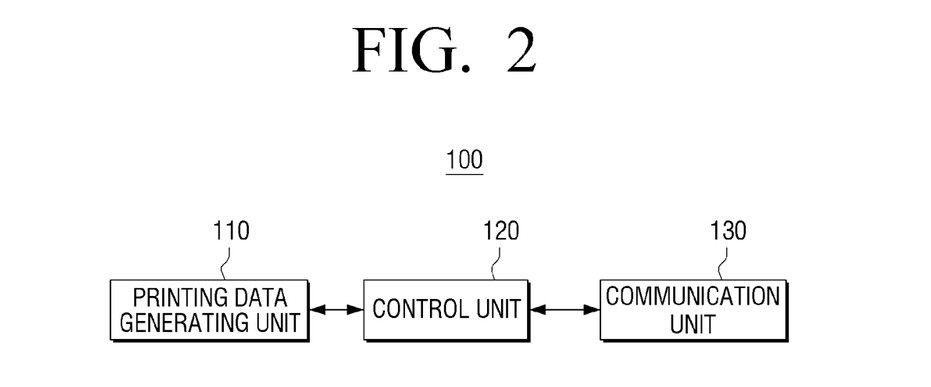
FIG. 2 is a block diagram illustrating a configuration of a print control apparatus according to an embodiment of the present disclosure.

FIG. 2 is a block diagram illustrating a configuration of a print control apparatus according to an embodiment of the present disclosure.

Referring to FIG. 2, the print control apparatus 100 according to an embodiment of the present disclosure includes a printing data generating unit 110, a communication unit 130, and a control unit 120.

The printing data generating unit 110 generates printing data. The printing data generating unit 110 spools the printing data to the image forming apparatus 200.

The communication unit 130 performs communication with the image forming apparatus 200 by a wired or wireless communication connection so as to transmit the printing data to the image forming apparatus 200 or to receive status information of the image forming apparatus 200 and printing job status information from the image forming apparatus 200.

The control unit 120 synchronizes an operation termination time of the printing data generating unit 110 with a printing job termination time of the image forming apparatus 200 by using the status information received from the image forming apparatus 200. In other words, the control unit 120, based on the status information received from the image forming apparatus 200, maintains the spooling operation of the printing data generating unit 110 until the printing job is completed by the image forming apparatus 200. If it is determined that the operation job of the image forming apparatus 200 is complete, the control unit 120 stops the spooling operation of the printing data generating unit 110, thereby emptying the printing data from the spooler included in the printing data generating unit 110.

Figure 3:
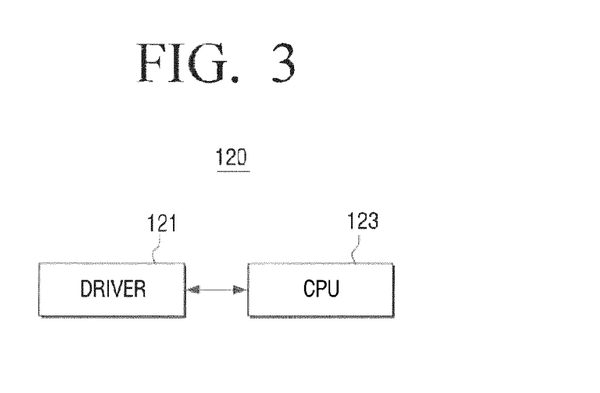
FIG. 3 is a block diagram illustrating a detailed configuration of a control unit as illustrated in FIG. 2.

FIG. 3 is a block diagram illustrating a detailed configuration of a control unit 120 as illustrated in FIG. 2.

Referring to FIG. 3, the control unit 120 includes a driver 121 and a central process unit (CPU) 123.

The driver 121 receives bi-directional messages from the image forming apparatus 200 through the communication unit 130, and transmits them to the central process unit 123.

The central process unit 123 performs an overall control operation of the control unit 120. In other words, according to instructions of the operating system of the print control apparatus 100, the central process unit 123 allows the print control apparatus 100 to read documents for printing, to convert them into printing data, and to send the printing data to the image forming apparatus 200. The central process unit 123 processes so that all types of functions that can be supported by the operating system can be performed. For example, an application that can be supported by the operating system can directly manage the image forming apparatus 200 and receive the status information of the image forming apparatus 200. For example, in order to use a print notification function of the image forming apparatus 200, the above-described driver is needed, and a bi-directional extensible markup language (XML) file to define that such an event is an event of the image forming apparatus, is required.

The central process unit 123 displays a bi-directional event message input through the driver 121 at a display unit 190 through the spooler, an explorer, a system event broker, etc., of the print control apparatus 100 by using the operating system.

Figure 4:
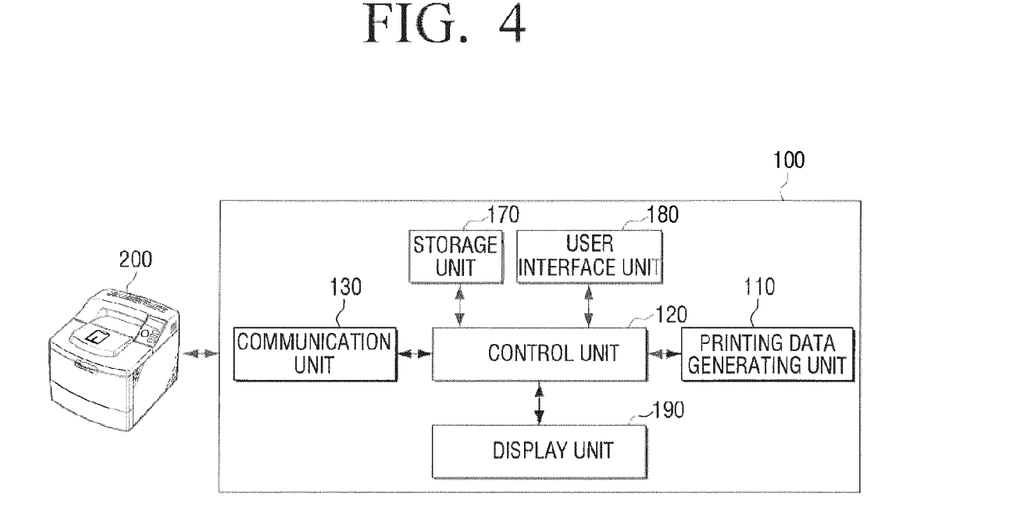
FIG. 4 is a block diagram explaining a detailed configuration of a print control apparatus according to another embodiment of the present disclosure.

FIG. 4 is a block diagram explaining a detailed configuration of a print control apparatus connectable to an image forming apparatus according to another embodiment of the present disclosure.

Referring to FIG. 4, the print control apparatus 100 according to an embodiment of the present disclosure performs communication with the image forming apparatus 200 through the communication unit 130. Also, the print control apparatus 100 may include a printing data generating unit 110, a communication unit 130, a control unit 120, a storage unit 170, a user interface unit 180, and a display unit 190.

The printing data generating unit 110 generates printing data for printing documents in the image forming apparatus 200. The printing data is represented by a page description language. At this time, the page description language is a language to explain contents of pages for printing in a higher level than actual bitmap outputs. The page description language may include, for example, a page description language (PDL), a printer command language (PCL), a Samsung page language (SPL), etc.

The communication unit 130 transmits the printing data to the image forming apparatus 200 and receives the status information from the image forming apparatus 200. The communication unit 130 may be implemented by at least one way of a universal serial bus (USB) communication and a simple network management protocol (SNMP) communication.

The control unit 120 may include a driver 121 and a central process unit (CPU) 123. In addition, the control unit 120 may include random access memories (RAMs) and read only memories (ROMs).

The control unit 120 analyzes whether there is a printing job completion message included in the status information received from the image forming apparatus 200. After that, if it is determined that there is the printing job completion message, the control unit 120 terminates the operation of the printing data generating unit 110.

Although the transmission of the printing data to the image forming apparatus 200 is complete, if the printing job completion message is not received from the image forming apparatus 200, the control unit 120 maintains the printing data in the spooler included in the printing data generating unit 110.

Figure 5:
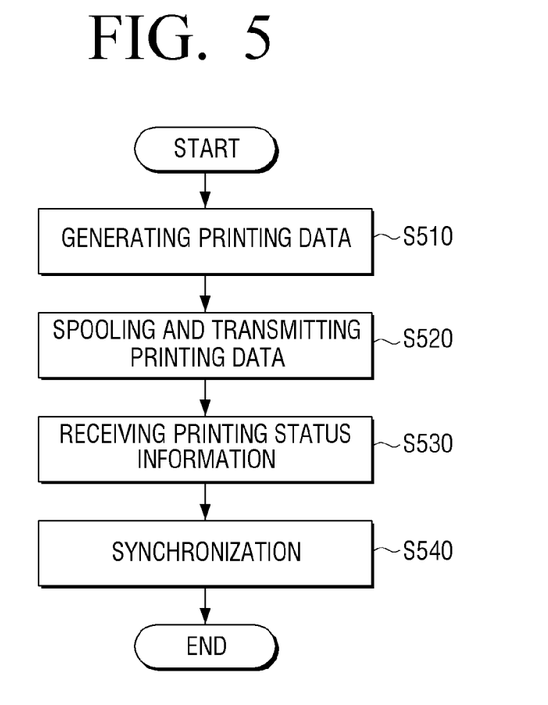
FIG. 5 is a flowchart explaining a print control method of a print control apparatus according to another embodiment of the present disclosure.

FIG. 5 is a flowchart explaining a print control method of a print control apparatus according to another embodiment of the present disclosure.

Referring to FIG. 5, a print control method of a print control apparatus according to another embodiment of the present disclosure includes operations of generating printing data (operation S510), spooling and transmitting the generated printing data (operation S520), receiving printing job status information (operation S530), and synchronizing a spooling termination time with a printing job termination time (operation S540).

The operation of generating printing data converts document data that is pre-stored in the print control apparatus 100 or documents, images, texts, etc., created by a user into data which an image forming apparatus, such as a printer, can print (operation S510).

The operation of spooling the printing data spools the converted printing data to the image forming apparatus. In other words, the print control apparatus 100 sequentially transmits the printing data to the image forming apparatus 200 while sequentially spooling printing data of each of pages constituting the printing data in a queue.

The operation of receiving printing job status information receives information with respect to the progress status of the printing job that is being performed in the image forming apparatus 200. As the image forming apparatus 200 starts to receive the printing data from the print control apparatus 100, the image forming apparatus 200 initiates a printing job. The print control apparatus 100 receives a name of the document being printed, a progress status, an owner of the apparatus, a page that is being printed, a size of the document, an apparatus status, printing job completion information, etc., from the image forming apparatus 200 that is performing the printing job.

The operation of synchronizing synchronizes the termination time of the spooling operation that the print control apparatus 100 transmits the printing data to the image forming apparatus 200 with the termination time of the printing job by the image forming apparatus 200. In other words, the print control apparatus 100 does not terminate the spooling operation, but maintains the spooling operation until the print control apparatus 100 receives the printing job termination message from the image forming apparatus 200. When the print control apparatus 100 receives the printing job termination message, the print control apparatus 100 transmits a return value to terminate the spooling operation to the printing data generating unit 110 in order for the spooling operation to be terminated. Hereinafter, a more detailed method that the print control apparatus 100 synchronizes the spooling operation termination time of the spooler with the printing job termination time of the image forming apparatus 200 will be described.

Figure 6:
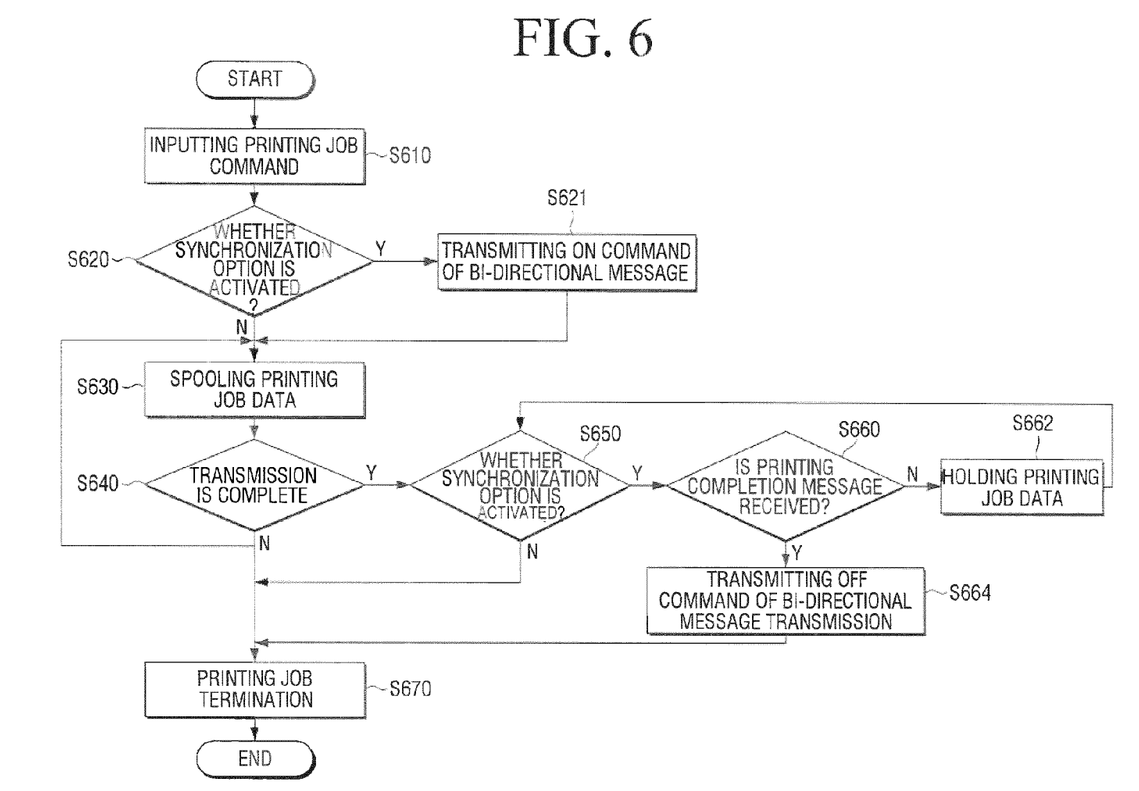
FIG. 6 is a flowchart explaining in detail an operation of synchronizing of FIG. 5.

FIG. 6 is a flowchart explaining in detail the operation 540 of synchronizing in FIG. 5.

Referring to FIG. 6, in the print control method according to an embodiment of the present disclosure, first, a user inputs a printing job command through the print control apparatus 100 (operation S610). For example, when the user prints a document written through a document creation program, pre-written documents, images, or other contents through an output application, the user inputs the printing job command based on a format supported by the output application. In other words, in a status in which the user creates a document by using a word processor application program or recalls and executes a pre-created document, the user can input the printing job command by selecting a print execution menu or by pressing a shortcut key.

An operation of determining whether a printing data synchronization option is executed determines: a) whether execution of the printing data synchronization option is activated in the print control apparatus 100; or b) whether execution of the printing data synchronization option is disabled in the print control apparatus 100 (operation S620). In other words, the print control apparatus 100 determines whether the pre-set synchronization option function is selected by the user, and if the synchronization option is selected (operation S620-Y), the print control apparatus 100 transmits an on command to activate to send a bi-directional message to the image forming apparatus 200 (operation S621). After that, the print control apparatus 100 performs spooling of the printing job data (operation S630).

If it is determined that the synchronization option is not selected (operation S620-N), the print control apparatus 100 does not perform the operation of transmitting an on command to activate sending a bi-directional message to the image forming apparatus 200 (operation S621), generates printing data, and spools and transmits the generated printing data to the image forming apparatus 200 (operation S630).

The print control apparatus 100 checks whether transmission of the printing data to the image forming apparatus 200 has been completed (operation S640). In other words, the print control apparatus 100 spools the printing data, and thus transmits the printing data to the image forming apparatus 200. If transmission of the printing data is normally completed, the image forming apparatus 200 sends a confirmation message that the transmission of the printing data is complete to the print control apparatus 100.

If the confirmation message is not received by the print control apparatus 100 for a predetermined period of time, the print control apparatus 100 determines that the transmission of the printing data is not complete (operation S640-N), and thus again generates the printing data or again spools the pre-generated printing data to the image forming apparatus 200 (operation S630).

If the confirmation message is received by the print control apparatus 100 within the predetermined period of time, the print control apparatus 100 determines that the transmission of the printing data is complete (operation S640-Y). After the transmission of the printing data is determined to be complete, the print control apparatus 100 checks whether the synchronization option is activated (operation S650).

If it is determined by the print control apparatus 100 that the synchronization option setting is not activated (operation S650-N), the print control apparatus 100 performs an operation of terminating the transmission of the printing data to terminate a function that sends the printing data (operation S670). In other words, in order to terminate the spooling operation of the print control apparatus 100, the print control apparatus 100 terminates the transmission of the printing data. At this time, the image forming apparatus 200 may continue the printing job. However, since all the printing data have already been sent to the image forming apparatus 200, the image forming apparatus 200 will perform the printing job using the received printing data.

If it is determined that the synchronization option setting is activated (operation S650-Y), the print control apparatus 100 determines whether a printing job completion message is received from the image forming apparatus 200 (operation S660). If it is determined that the printing job completion message is not received (operation S660-N), the print control apparatus 100 allows the printing data to be held in the spooler. In other words, if the printing job completion message is not received, even when the printing data generating unit 110 completes the spooling operation, the print control apparatus 100 does not erase the printing data from the spooler, but keeps the printing data in the spooler so that operation of the printing data generating unit 110 can be maintained in an activate state (operation S662).

If it is determined that the printing job completion message is received (operation S660-Y), the print control apparatus 100 sends an off command to disable a bi-directional message transmission to the image forming apparatus 200 (operation S664). After that, the print control apparatus 100 determines that the printing job is terminated, and terminates the corresponding printing job (operation S670). The printing job termination in the print control apparatus 100 refers to a state in which the print control apparatus 100 no longer receives status information from and transmits the printing data to the image forming apparatus 200.

As described above, according to the print control method according to the present embodiment, the print control apparatus 100 keeps the operation of the printing data generating unit 110 in an activate state until receiving the printing job completion message from the image forming apparatus 200. As a result, even when the spooling operation is completed, if the image forming apparatus 200 is still performing the printing job, the print control apparatus 100 can receive status information from the image forming apparatus 200, and therefore the print control apparatus 100 can continue to monitor the image forming apparatus 200.

Figure 7:
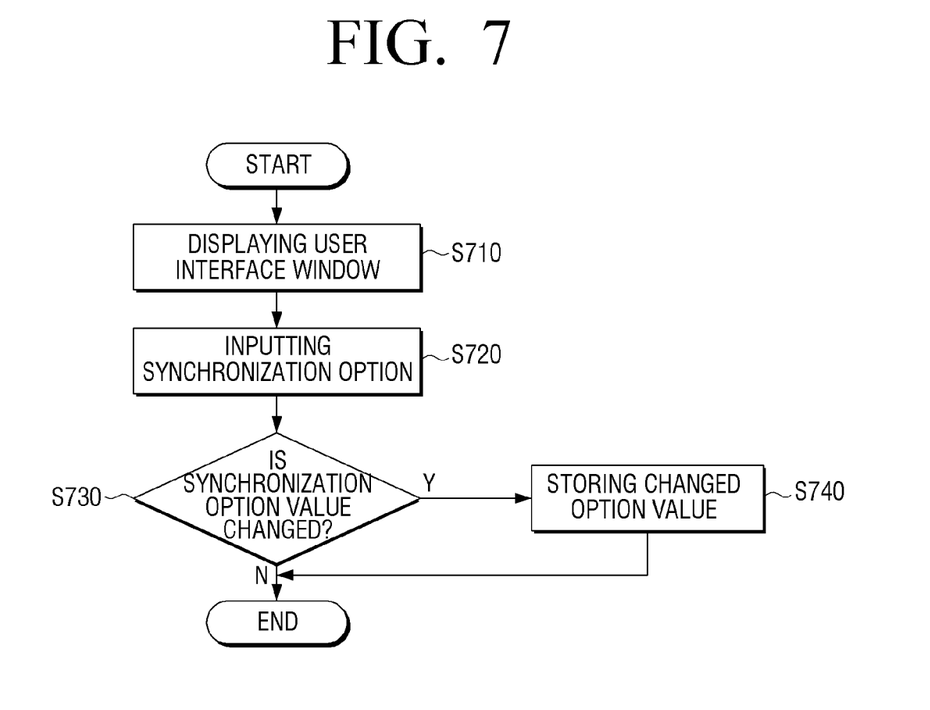
FIG. 7 is a flowchart explaining a method of setting a synchronizing option in a print control method according to another embodiment of the present disclosure.

FIG. 7 is a flowchart explaining a method of setting a synchronization option in a print control method according to another embodiment of the present disclosure.

Referring to FIG. 7, the method of setting the synchronization option includes operations of displaying a user interface window (operation S710), inputting the synchronization option (operation S720), determining whether a synchronization option value is changed (operation S730), and storing a changed option value (operation S740).

Figure 8:
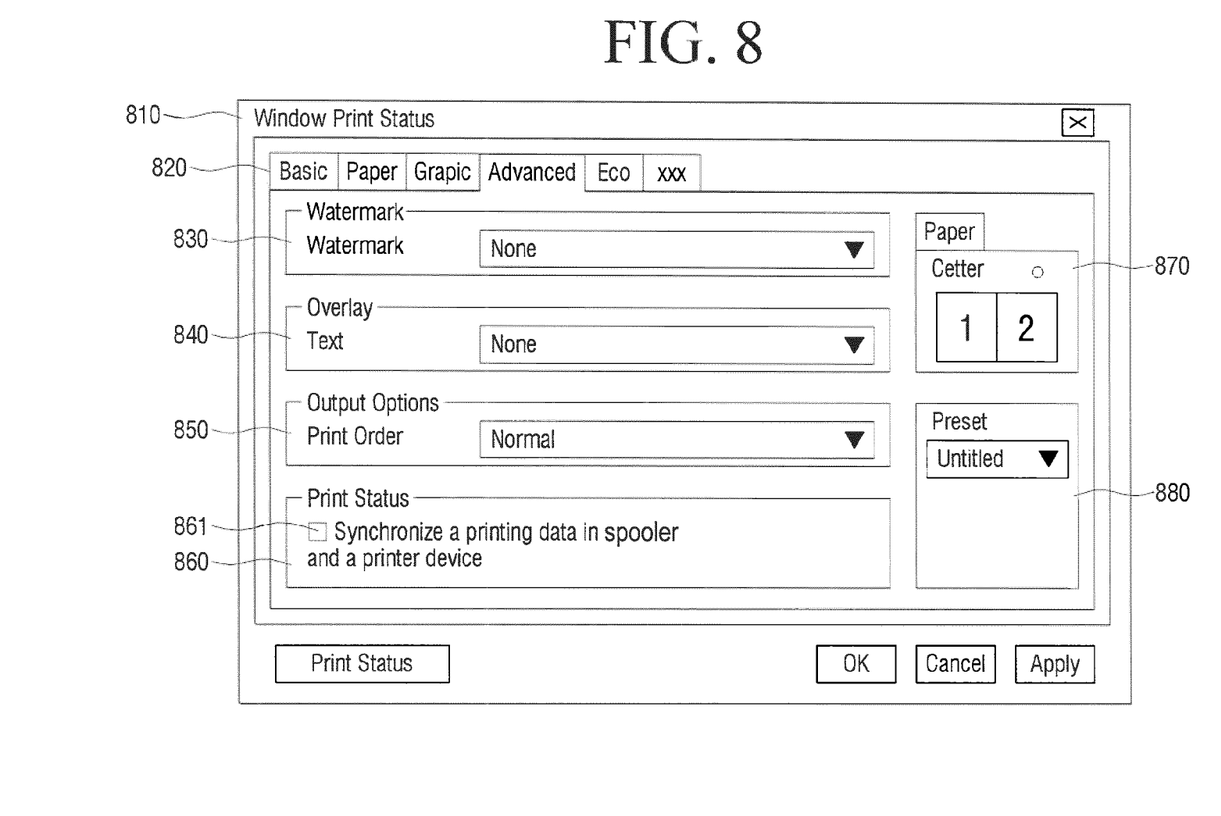
FIG. 8 is a view explaining an example of a user interface window to set a synchronizing option according to an embodiment of the present disclosure.

In the operation of displaying a user interface window, the user interface window may include various setting information about the image forming apparatus 200, such as device information, print information, paper information, etc. The user interface window may be implemented in various forms by manufacturers of the image forming apparatus or by manufacturers of the print control apparatus. An embodiment of the user interface window is illustrated in FIG. 8. The layout of the user interface window can vary by manufacturers that manufacture the image forming apparatus 200.

FIG. 8 is a view explaining an example of a user interface window to set a synchronization option according to an embodiment of the present disclosure. Referring to FIG. 8, the user interface window may include a window information indicating area 810, a detailed information items area 820, a watermark item area 830, an overlay item area 840, an output options item area 850, a print status item area 860, a paper setting item area 870, and a preset item area 880.

The above-described item areas may be added, modified, or changed by manufacturers of the image forming apparatus. In the user interface window 800, other item areas except the print status item area 860 are not distinctive features of the present disclosure and are not associated with the synchronization option setting of the present disclosure; therefore, detailed descriptions thereof will be omitted.

The print status item area 860 includes a selection button 861 to activate synchronizing printing data in the spooler and a printer device, and the user can select or deselect the selection button 861. When the selection button 861 is selected, a synchronization option of a spooling termination time and a printing job termination time is activated. However, if the selection button 861 is not selected, the synchronization option is disabled.

The layout as illustrated in FIG. 8 may be variously changed according to embodiments, and the print status item area 860 may be implemented as buttons of a variety of forms. Various embodiments thereof will be omitted.

Figure 9:
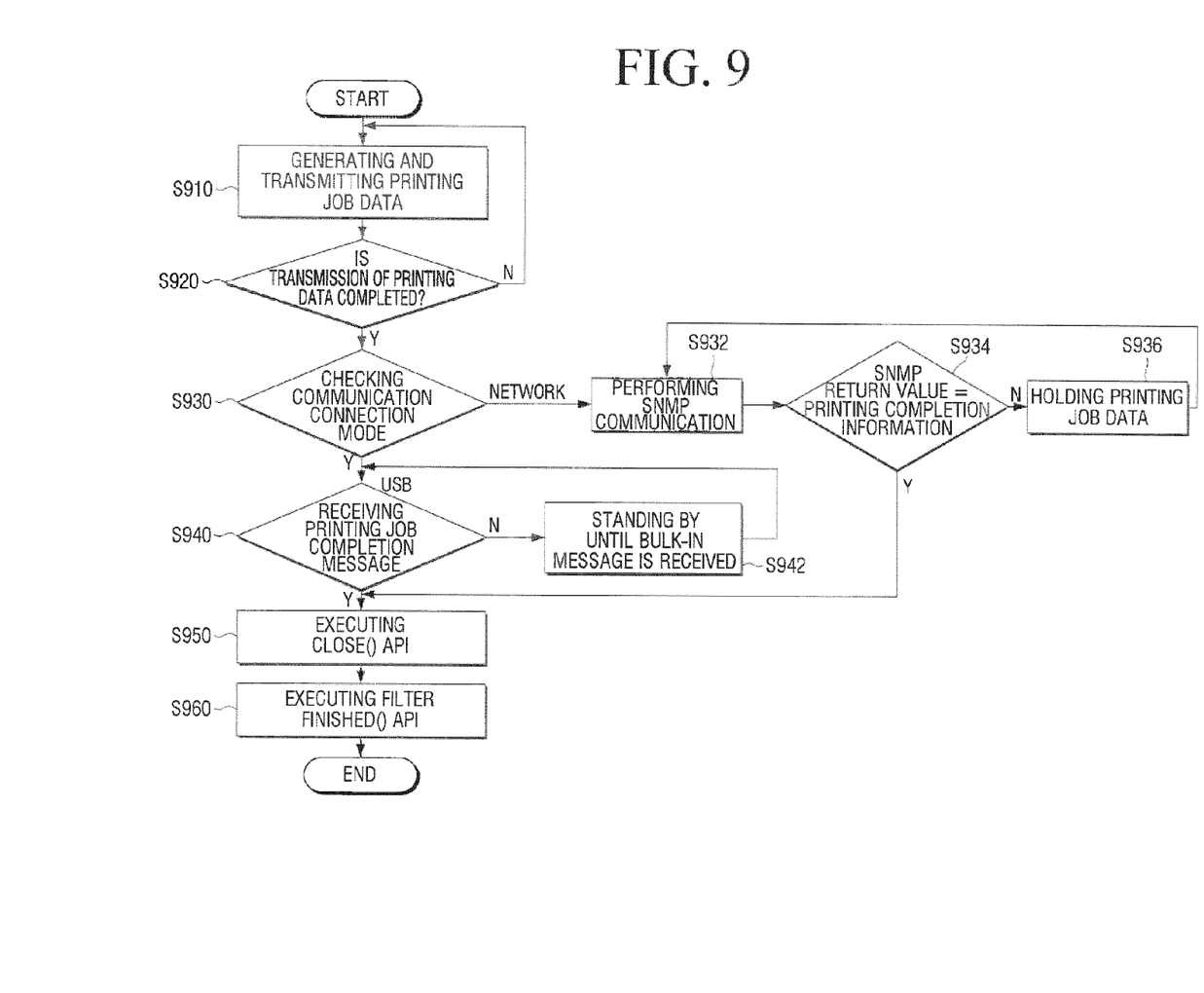
FIG. 9 is a flowchart explaining a print control method that differently performs a synchronizing process depending on a communication way of a print control apparatus according to an embodiment of the present disclosure.

FIG. 9 is a flowchart explaining a print control method that differently performs a synchronization process according to a communication way of a print control apparatus according to an embodiment of the present disclosure.

Referring to FIG. 9, the print control apparatus 100 generates printing data, performs signal processing for the printing data, and transmits the printing data to the image forming apparatus 200 (operation S910). The print control apparatus 100 recalls pre-stored printing data or converts a document data created by the user into printing data that the image forming apparatus 200 can print. For example, the printing data may be represented by a page description language. At this time, the page description language is a language to explain contents of pages for printing in a higher level than actual bitmap outputs. The page description language may include, for example, a page description language (PDL), a printer command language (PCL), a Samsung page language (SPL), etc.

The print control apparatus 100 starts to transmit the printing data to the image forming apparatus 200. The print control apparatus 100 receives a confirmation message from the image forming apparatus 200, and determines whether the transmission of the printing data is completed based on the confirmation message (operation S920). If it is determined that the transmission of the printing data is not completed (operation S920-N), the print control apparatus 100 again performs the printing data processing and the printing data transmission (operation S910).

If the print control apparatus 100 determines that the transmission of the printing data is completed based on the confirmation message received from the image forming apparatus 200 (operation S920-Y), the print control apparatus 100 checks a connection port that currently works in order to check a connection type with the image forming apparatus 200 (operation S930).

As a result, the print control apparatus 100 can determine to be connected to the image forming apparatus 200 by an USB communication connection or by a TCP/IP communication connection. FIG. 9 illustrates only the USB communication connection and the TCP/IP communication connection as types of communication options; however, this is only exemplary options for the convenience of description. In addition to these communication options, the present disclosure can be applied to a variety of communication connection options that the print control apparatus 100 and image forming apparatus 200 can support.

If it is determined that the connection port is the TCP/IP communication connection, the print control apparatus 100 performs a simple network management protocol (SNMP) communication with the image forming apparatus 200 at predetermined intervals (operation S932). At this time, the SNMP communication refers to a protocol that automatically collects a variety of information from each of a plurality of hosts on the TCP/IP based network regularly so as to manage the network. For example, since the print control apparatus 100 communicates with the image forming apparatus 200 by the TCP/IP communication connection, it receives status information from the image forming apparatus 200 at predetermined intervals.

The print control apparatus 100 determines whether a SNMP return value received from the image forming apparatus 200 includes printing job completion information (operation S934). If it is determined that the SNMP return value includes the printing completion information (operation S934-Y), the print control apparatus 100 performs an operation of execution closing API (operation S950). The print control apparatus 100 blocks a path to transmit the printing data to the image forming apparatus 200, and blocks connection between a FilterPipeline and a filter.

If it is determined that the SNMP return value does not include the printing completion information (operation S934-N), the print control apparatus 100 allows the printing data to be held in the spooler (operation S936). In other words, although the printing data is completed to be transmitted to the image forming apparatus 200 through the spooler, the print control apparatus 100 makes the spooler remain in an active state without stopping operation of the spooler. At this time, the spooler holding the printing data means that the spooler does not repeatedly transmit the printing data to the image forming apparatus 200, but instead keeps the printing data the same as when it performs the spooling operation at the time the spooler is activated.

Although the print control apparatus 100 completes transmitting the printing data to the image forming apparatus 200, if the print control apparatus 100 determines that the image forming apparatus 200 has not completed the printing job, the print control apparatus 100 continuously performs the SNMP communication with the image forming apparatus 200. The print control apparatus 100 regularly receives status information from the image forming apparatus 200.

Although the print control apparatus 100 does not transmit a printing job message to the image forming apparatus 200, if the image forming apparatus 200 is continuously performing the printing job, the print control apparatus 100 can monitor the image forming apparatus 200 since it receives the status information from the image forming apparatus 200.

If it is determined that the connection port is the USB communication type connection, the print control apparatus 100 checks whether there is a receiving a printing job completion message from the image forming apparatus 200 (operation S940). If the printing job completion message is not received (operation S940-N), the print control apparatus 100 stands by until a bulk-in message is received from the image forming apparatus 200 (operation S942). At this time, the print control apparatus 100 may send a signal that requests to transmit the bulk-in message to the image forming apparatus 200 according to the USB communication protocol.

If it is determined that the printing job completion message is included in the bulk-in message received from the image forming apparatus 200 (operation S940-Y), the print control apparatus 100 terminates communication between a FilterPipeline SVC and the Filter using a specific API. In other words, the print control apparatus 100 runs Close ( ) API, and thus blocks a path to transmit the printing data between the print control apparatus 100 and the image forming apparatus 200 (operation S950).

After operation S950, the print control apparatus 100 executes Filterfinished ( ) API, and thus terminates connection between the FilterPipeline SVC and the Filter (operation S960).

Figure 10:
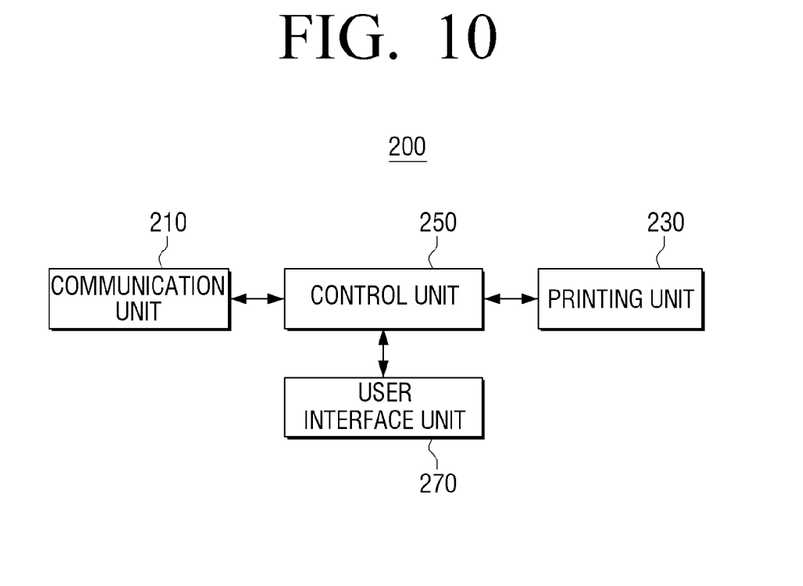
FIG. 10 is a block diagram explaining an image forming apparatus according to another embodiment of the present disclosure.

FIG. 10 is a block diagram explaining an image forming apparatus according to an embodiment of the present disclosure.

Referring to FIG. 10, the image forming apparatus 200 according to another embodiment of the present disclosure includes a communication unit 210, a printing unit 230, a control unit 250, and a user interface unit 270.

The communication unit 210 receives printing data from the print control apparatus 100. The communication unit 210 can communicate with the communication unit 130 of the print control apparatus 100 by various communication methods. For example, the communication units 130 and 210 may be interfaced with each other by the USB communication connection and the simple network management protocol (SNMP) communication connection.

The printing unit 230 prints the received printing data. For example, if the image forming apparatus 200 is a color laser printer, an image is printed through image forming processes such as charging, writing, developing, transferring, fusing, etc. At this time, the charging refers to a process that applies a high voltage (approximate 7000V) to a charging device so as to form negative (−) charges on a surface of a photosensitive medium by a corona electric discharge. The writing refers to a process that scans a laser beam onto the surface of the photosensitive medium on which the negative charges are formed, and thus erases the negative charges in the form of letters so as to form a latent image. The developing refers to a process that allows toner particles having a negative (−) nature to be attached onto the latent image of the surface of the photosensitive medium. The transferring refers to a process that, when a printing medium passes through between the photosensitive medium and a transfer device, applies a predetermined transfer voltage to the transfer device so as to form positive (+) charges on the rear side of the printing medium so that the negative (−) toner particles are moved from the surface of the photosensitive medium to the printing medium. The fusing refers to a process that applies proper heat and pressure to the toner particles formed on the printing medium so as to allow the toner particles to be completely fused to the printing medium. Through all these steps, an image is formed on the printing medium and is output.

The control unit 250 analyzes a status of the printing job of the printing unit 230 and generates status information, and, after the printing job is completed by the printing unit 230, the control unit 250 generates a printing job completion message, makes the printing job completion message be included in the status information, and transmits the status information.

An image forming apparatus according to another embodiment of the present disclosure may include a user interface unit 270. The user interface unit 270 is an input interface in which the user can select whether to activate a synchronization option. The user interface unit 270 performs the same or similar functions as those of the user interface unit 180 of the print control apparatus 100 as described above. In other words, the user interface unit 270 may be formed as a user interface window. The user interface window may include various setting information about the image forming apparatus 200, such as device information, print information, paper information, etc. The user interface window may be implemented in various forms by manufacturers of the image forming apparatus or by manufacturers of the print control apparatus. An embodiment of the user interface window has been described above; therefore, a detailed description thereof will be omitted.

The control unit 250 may generate and transmit the printing completion message to the print control apparatus 100 according to a user command input through the user interface unit 270.

Figure 11:
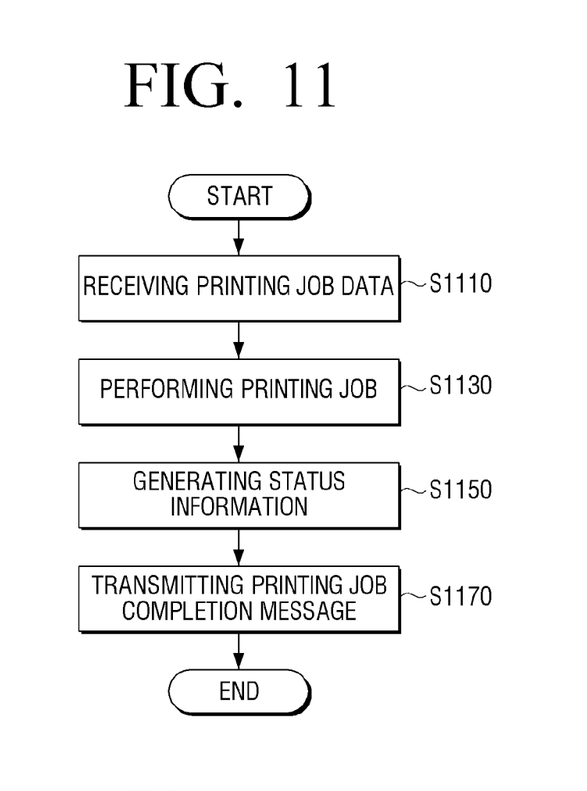
FIG. 11 is a flowchart explaining a print control method of an image forming apparatus according to another embodiment of the present disclosure.

FIG. 11 is a flowchart explaining a print control method of an image forming apparatus according to another embodiment of the present disclosure.

Referring to FIG. 11, a print control method includes operations of receiving printing job data (operation S1110), performing a printing job (operation S1130), generating status information (operation S1150), and transmitting a printing job completion message (operation S1170).

The operation of receiving printing job data receives the printing job data represented by a page description language from the print control apparatus 100 (operation S1110). At this time, the page description language for indicating the printing data may include, for example, a page description language (PDL), a printer command language (PCL), a Samsung page language (SPL), etc.

The operation of performing a printing job performs the printing job through processes of charging toner particles based on the received printing data, writing and developing areas to be printed, transferring the toner particles, and fusing (operation S1130), as described above.

In the operation of generating status information, the image forming apparatus 200 searches information about a printing job status and an apparatus status, and generates the status information (operation S1150). In other words, the information about a printing job status refers to information about the printing job that is currently being performed, for example, information of pages that are complete to be printed, information of a page that is being printed, information of document types, information of a document size, etc. The information about the apparatus status relates to whether a printing medium is jammed, whether the image forming apparatus is operating normally, whether a door thereof is open, and other status information about the image forming apparatus. Also, in addition to the information about the printing job status and the status information about the image forming apparatus, the status information may include printing completion message information relating to whether the image forming apparatus completes the corresponding printing job.

Figure 12:
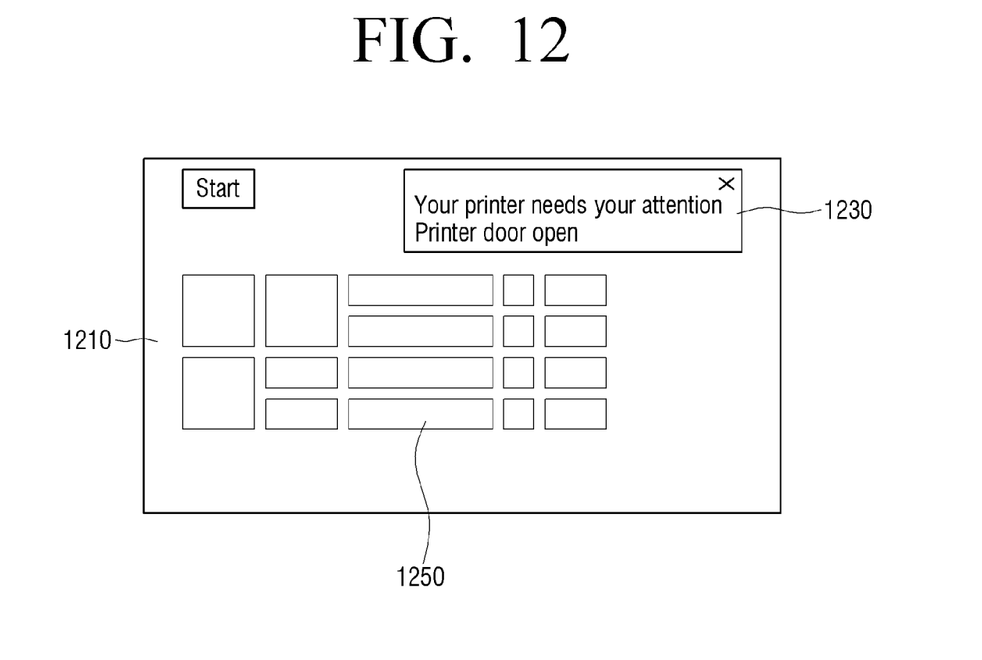
FIG. 12 is a view illustrating an example of a user interface window that can be displayed on a user interface unit of FIG. 10.

FIG. 12 is a view illustrating an example of a user interface window that can be displayed on a user interface unit of FIG. 10.

Referring to FIG. 12, a message window 1230 that indicates status information according to an embodiment of the present disclosure may be displayed on a desktop 1210 of a new operating system. An execution area 1250 including a plurality of applications, icons, images, folders, etc. may be displayed on the desktop 1210.

The message window 1230 may be implemented as a popcorn type of message. Alternatively, when the user executes a print command and the image forming apparatus 200 starts a printing job, the message window 1230 may be displayed on the desktop. The message window 1230 may be displayed at various locations of the desktop.

Figure 13:
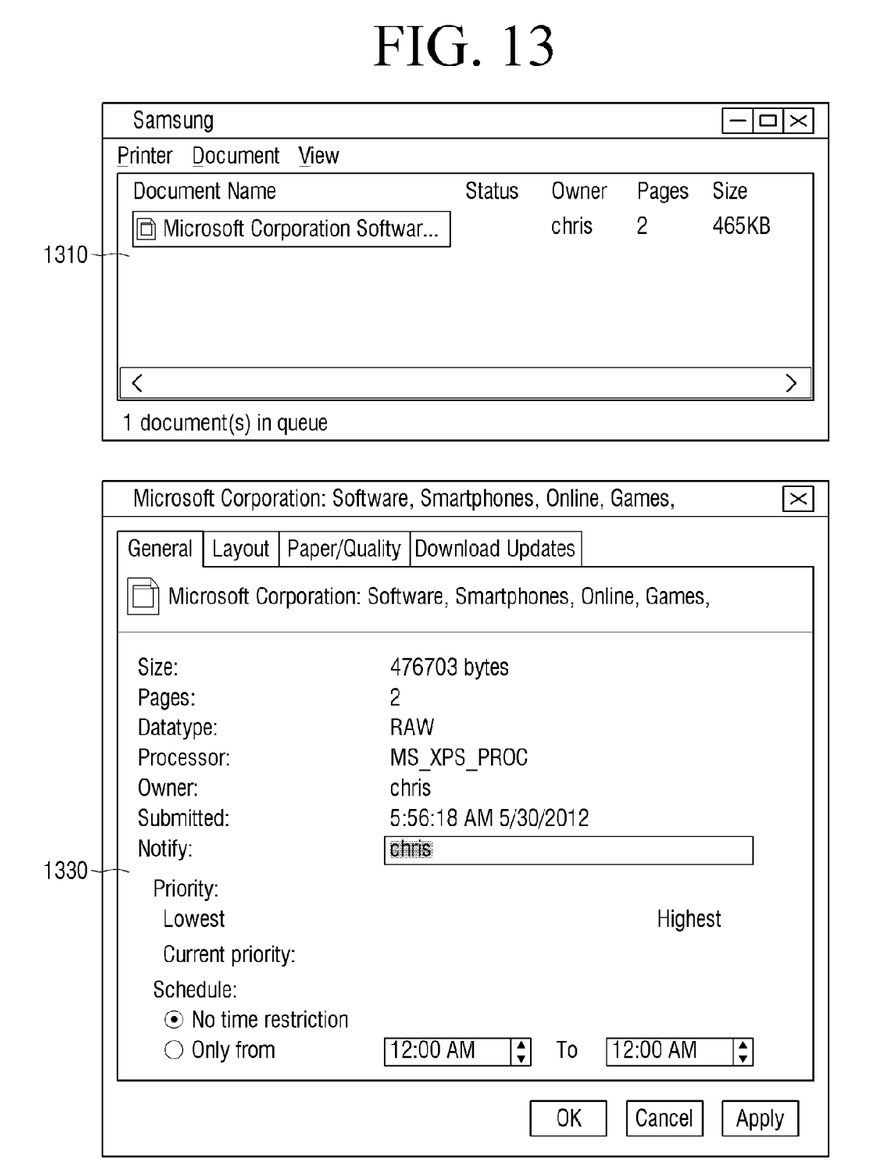
FIG. 13 is a view explaining a screen to display a printing job status of an image forming apparatus in a print control apparatus of which a synchronization function is activated according to an embodiment of the present disclosure.

FIG. 13 is a view explaining a screen to display a printing job status of an image forming apparatus in a print control apparatus of which a synchronizing function is activated according to an embodiment of the present disclosure.

Referring to FIG. 13, a printing job screen to display a printing job status includes a printing job window 1310 to explain a status that a specific document is being spooled and a detailed information window 1330 to display a detailed explanation about a document that is currently being printed.

The printing job window 1310 is a window that indicates various information about a document that is currently being printed. In other words, the printing job window 1310 may indicate information such as a name, a status, an owner, a page, a size, etc., of a current document. The printing job screen may be implemented by only the printing job window 1310.

The detailed information window 1330 is a window that indicates detailed information about the document that is being printed. As illustrated in FIG. 13, the detailed information window 1330 may consist of a general information item, a layout item, a paper/quality item, a download updates item.

Referring to the detailed information window 1330 as illustrated in FIG. 13, the detailed information window 1330 indicates the name of the document, the size (for example, 476703 bytes), the pages (for example, 2 page), the data type (for example, RAW), the processor (for example, MS_XPS_PROC), the owner (for example, chris), the submitted time (for example, 5:56:18 AM 5/30/2012), the person to be notified (for example, chris), the priority, and the schedule. The schedule can be set through the detailed information window 1330.

In detail, codes for executing the above-described methods may be stored in various types of recording media, which can be read by terminal devices, such as a random access memory (RAM), a flash memory, a read only memory (ROM), an erasable programmable read only memory (EPROM), an electronically erasable and programmable read only memory (EEPROM), a register, a hard disk, a removable disk, a memory card, a USB memory, a CD-ROM, etc.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. A print control apparatus connectable to an image forming apparatus, the print control apparatus comprising:
 a display unit;
 a printing data generating unit that generates printing data and spools the printing data to the image forming apparatus;
 a communication unit that receives status information of the image forming apparatus; and
 a control unit that controls the communication unit to receive status information about a work of the image forming apparatus throughout the progress of printing of the printing data during spooling of the printing data and after completion of the spooling by the printing data generating unit, and after transmission of the printing data is complete, the print control apparatus checks a connection type with the image forming apparatus, receives the status information according to the checked connection type, and determines whether to terminate communication with the image forming apparatus based on the status information received according to the checked connection type,
 wherein the print control apparatus operates in an operating system in which the status information of the image forming apparatus is identified only when the printing data is being loaded in a spooler,
 wherein the control unit maintains the printing data in the spooler until the print control apparatus receives a work completion message from the image forming apparatus, and
 wherein the control unit generates a printing job status screen by using the received status information, and controls the display unit to display the generated printing job status screen, when the image forming apparatus starts a print job.

2. The print control apparatus of claim 1, wherein:
 the control unit determines whether there is a printing completion message included in the received status information, and if there is the printing completion message, the control unit terminates operation of the printing data generating unit.

3. The print control apparatus of claim 2, further comprising:
 a user interface unit;
 wherein the control unit determines whether to synchronize an operation termination time of the printing data generating unit and a printing job termination time of the image forming apparatus depending on a user command that is input through the user interface unit.

4. The print control apparatus of claim 2, wherein:
 the printing completion message comprises a bi-directional extensible markup language (XML) type of message.

5. The print control apparatus of claim 1, wherein:
 the communication unit receives the status information by at least one of a universal serial bus (USB) communication connection and a simple network management protocol (SNMP) communication connection.

6. A print control method of a print control apparatus connectable to an image forming apparatus, the print control method comprising:
 generating printing data and spooling the printing data to the image forming apparatus;
 receiving status information of a printing job throughout the progress of the printing job;
 generating a printing job status screen using the status information;
 displaying the printing job status screen;
 determining whether the spooling of the printing data is complete; and
 controlling to receive the status information about the printing job of the image forming apparatus during spooling and after completion of the spooling, and after transmission of the printing data is complete, checking a connection type with the image forming apparatus, receiving the status information according to the checked connection type, and determining whether to terminate communication with the image forming apparatus based on the status information received according to the checked connection type,
 wherein the print control apparatus operates in an operating system in which the status information of the image forming apparatus is identified only when the printing data is being loaded in a spooler, and
 wherein the print control apparatus maintains the printing data in the spooler until the print control apparatus receives a printing job completion message from the image forming apparatus.

7. The print control method of claim 6, wherein:
 the controlling to receive the status information about the printing job of the image forming apparatus further comprises:
 determining whether there is a printing completion message included in the status information; and
 if it is determined that the printing job completion message is included, terminating the spooling.

8. The print control method of claim 7, wherein:
 the printing completion message comprises a bi-directional extensible markup language (XML) type of message.

9. The print control method of claim 6, wherein:
 the receiving status information of a printing job receives the status information by at least one of a universal serial bus (USB) communication way and a simple network management protocol (SNMP) communication way.

10. The print control method of claim 6, further comprising:
 inputting a user command; and
 determining whether to execute the controlling to receive the status information about the printing job of the image forming apparatus depending on the input user command.

11. An image forming system comprising:
 a print control apparatus that generates and spools printing data; and
 an image forming apparatus that performs a printing job using the printing data,
 wherein even after spooling of the print control apparatus is complete, the image forming apparatus generates status information and transmits the status information to the print control apparatus throughout the progress of the printing job,
 after transmission of the printing data is complete, the print control apparatus checks a connection type with the image forming apparatus, receives the status information according to the checked connection type, and determines whether to terminate communication with the image forming apparatus based on the status information received according to the checked connection type, and after the printing job is complete, the image forming apparatus generates and transmits a printing job termination message to the print control apparatus, wherein the print control apparatus searches for the printing job termination message in the status information received from the image forming apparatus, and if the searched printing job termination message is determined to exist, the print control apparatus terminates operations thereof, wherein the print control apparatus operates in an operating system in which the status information of the image forming apparatus is identified only when the printing data is being loaded in a spooler, wherein the print control apparatus maintains the printing data in a spooler until the print control apparatus receives a printing job completion message from the image forming apparatus, and wherein the print control apparatus generates a printing job status screen by using the received status information, and displays the generated printing job status screen when the image forming apparatus starts the printing job.

12. The image forming system of claim 11, wherein:

the image forming apparatus receives an input of a user command, and depending on the input of the user command, the print control apparatus determines whether to perform a control operation to receive the status information about the printing job of the image forming apparatus.

* * * * *